Patented Sept. 1, 1925.

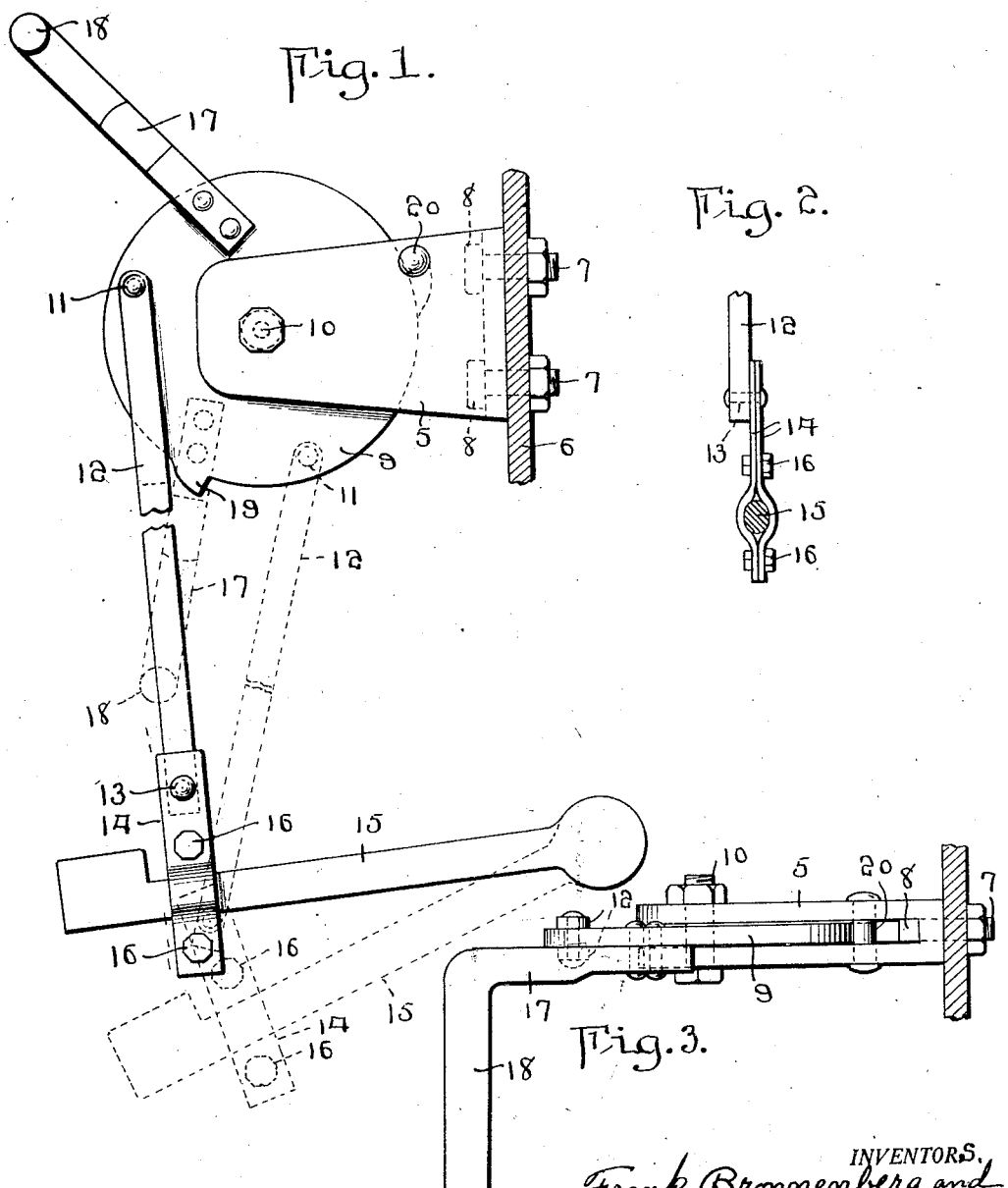

1,552,207

UNITED STATES PATENT OFFICE.

FRANK BRONNENBERG AND WALTER BRONNENBERG, OF CHESTERFIELD, INDIANA.

CLUTCH-CONTROL DEVICE.

Application filed January 3, 1925. Serial No. 404.

*To all whom it may concern:*

Be it known that we, FRANK BRONNENBERG and WALTER BRONNENBERG, citizens of the United States, residing at Chesterfield, in the county of Madison and State of Indiana, have invented certain new and useful Improvements in Clutch-Control Devices, of which the following is a specification.

This invention relates to improvements in clutch control devices adapted for application to the clutch pedal of a tractor or other vehicle, although not necessarily limited to such use.

The invention has for its object to provide a device of this character by which the clutch pedal may be moved to and retained in open or clutch-releasing position without, however, interfering with the usual operation of the clutch as by pressure applied directly thereto.

A further object is the provision of a clutch control device embodying such structural characteristics as will insure the retention of the clutch pedal in open position even when subjected to such violent vibration as that produced by a moving tractor.

In the accompanying drawing wherein an approved embodiment of the invention is illustrated:—

Figure 1 is a side elevation of the control device, showing its application to a clutch pedal.

Figure 2 is a section on the line 2—2 of Fig. 1.

Figure 3 is a top plan view of the device.

Referring to the drawing in detail, the numeral 5 indicates a supporting bracket adapted to be secured to the dash 6 of a tractor or to any other suitable support by bolts 7 having heads 8 of a size and shape to be received between the parallel portions of the bracket 5, the latter being substantially U-shaped and receiving the bolts 7 through the web portion thereof.

A rotatable member 9 in the form of a disk is journaled in the bracket 5 upon a bolt 10 and is pivotally secured at 11 between the bifurcations at the upper end of a rod 12, the latter being pivotally connected at its lower end 13 to a pair of clamping members 14. The medial portion of the members 14 are shaped to embrace a foot pedal 15 to which they are clamped by suitable adjustment of screws 16.

In applying the device to use, the bracket 5 is secured to the support 6 in such position with respect to the pedal 15 that, with the latter in engaged or operative position as shown in full lines in Figure 1, the pivot 11 is located slightly above the plane of the axis of the bolt. When depressing the clutch pedal in the usual manner, its motion is transmitted to the rotatable member 9 through the members 14 and rod 12. This rocking movement is not, however, sufficient to cause the pivot 11 to pass through a plane intersecting the axis of the bolt 10 and the point of attachment of the clamping members 14, so that, when pressure on the pedal is released and it returns in usual manner to its initial position, the direction of motion of the rotatable member 9 is reversed and the pivot 11 is restored to the position shown in full lines in Figure 1.

For convenience in operating the device, a handle 17 is rigidly secured to the rotatable member 9 and provided with an angular end 18. When the handle 17 is turned to the position indicated in dotted lines in Figure 1, the pedal 15 is depressed and the pivot 11 is moved to a position on the side of the plane intersecting the bolt 10 and the point of attachment of the clamping members 14 opposite that which it normally occupies, and hence, when pressure on the handle 17 is released, the tension of the spring acting on the depressed pedal 15 tends to continue rotation of the member 9. Continuation of such rotation is arrested by a stop lug 19 carried by the member 9 and engaging a stop pin 20 riveted in the bracket 5.

In this position, clearly shown in dotted lines in Figure 1, the clutch pedal 15 is securely held in depressed or released position, thus relieving the operator from maintaining pressure thereon. When it is desired to permit return of the clutch pedal to engaged or operative position, the handle 17 is swung upwardly until the pivot 11 passes dead center between the bolt 10 and the members 14, whereupon said pedal is free to return under the tension of the spring acting thereon.

From the foregoing, it is believed that the construction, operation and advantages of the invention may be readily understood by those skilled in the art, and it is apparent that changes may be made in the details disclosed without departing from the spirit of the invention as expressed in the appended claims.

What we claim is:

1. A clutch control device including a supporting bracket, a stop carried by said bracket, a member rotatably supported in said bracket, an outstanding lug carried by said rotatable member in position to engage the stop of said bracket when said rotatable member is rotated, a rod pivotally connected at one end to a point on said member eccentric to the axis thereof, and means for attaching the opposite end of said rod to a clutch pedal, said stop mechanism adapted to arrest the movement of the rotatable member and maintain the clutch pedal attached to said rod in depressed position.

2. A clutch control device including a supporting bracket, a member rotatably supported in said bracket, a rod pivotally connected at one end to a point on said member eccentric to the axis thereof, means for attaching the opposite end of said rod to a clutch pedal, and coacting stops carried by said bracket and said rotatable member adapted to arrest the rotary movement of the latter and maintain a clutch pedal attached to said rod in depressed position, one of said stops including a lug carried by the rotatable member and the other stop being constituted by a pin carried by the bracket, and a handle carried by the rotatable member.

3. A clutch control device including a U-shaped bracket, a disk rotatably mounted between the parallel portions of said bracket, a rod pivotally connected with the disk at a point eccentric to the axis thereof, means for attaching said rod to a clutch pedal, a stop pin connecting the parallel portions of said bracket, and a peripheral lug carried by the disk engageable with said pin to arrest rotary movement of said disk and retain a clutch pedal attached to said rod in depressed position.

4. In combination a clutch pedal, a rotatable member, an outstanding lug carried by said rotatable member, a rod pivotally connected with said pedal and said rotatable member at a point eccentric to the axis of the latter, the pivotal connection of the rod with the rotatable member normally lying on one side of a plane passing through the axis of said member and the point of connection of said rod with said pedal and movable, during rotation of said member, to a position on the opposite side of said plane, and a stationary stop in the path of said lug and operative to limit the rotary movement of the rotatable member, and an operating handle carried by said member.

In testimony whereof we affix our signatures.

FRANK BRONNENBERG.
WALTER BRONNENBERG.